US012604923B2

(12) United States Patent
Sudo et al.

(10) Patent No.: US 12,604,923 B2
(45) Date of Patent: Apr. 21, 2026

(54) COMPOSITION FOR AEROZOL FOOD PRODUCT, HYDROXYPROPYL METHYLCELLULOSE, AND METHOD OF PRODUCING HYDROXYPROPYL METHYLCELLULOSE

(71) Applicant: SHIN-ETSU CHEMICAL CO., LTD., Tokyo (JP)

(72) Inventors: Takane Sudo, Joetsu (JP); Mitsuo Narita, Joetsu (JP); Atsushi Yamamoto, Osaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 350 days.

(21) Appl. No.: 16/987,394

(22) Filed: Aug. 7, 2020

(65) Prior Publication Data

US 2021/0037877 A1 Feb. 11, 2021

(30) Foreign Application Priority Data

Aug. 9, 2019 (JP) ................................. 2019-148194

(51) Int. Cl.
| | |
|---|---|
| *A23P 30/40* | (2016.01) |
| *A23C 13/12* | (2006.01) |
| *A23L 27/60* | (2016.01) |
| *C08B 11/02* | (2006.01) |

(52) U.S. Cl.
CPC .............. *A23P 30/40* (2016.08); *A23C 13/12* (2013.01); *A23L 27/60* (2016.08); *C08B 11/02* (2013.01); *A23V 2002/00* (2013.01)

(58) Field of Classification Search
CPC ..................................................... A23C 13/12
See application file for complete search history.

(56) References Cited

U.S. PATENT DOCUMENTS

| | | | | |
|---|---|---|---|---|
| 2007/0071874 A1* | 3/2007 | Cash | ...................... | A23C 13/12 |
| | | | | 426/601 |
| 2014/0194618 A1 | 7/2014 | Narita | | |
| 2014/0234521 A1 | 8/2014 | Lim | | |
| 2015/0237899 A1 | 8/2015 | Cao et al. | | |
| 2015/0239992 A1 | 8/2015 | Goerlach-Doht et al. | | |
| 2017/0267786 A1 | 9/2017 | Yamashita | | |
| 2020/0296983 A1 | 9/2020 | Madsen | | |

FOREIGN PATENT DOCUMENTS

| | | |
|---|---|---|
| DE | 102006057188 A1 | 6/2008 |
| EP | 0370447 A1 | 5/1990 |
| EP | 0835882 A2 | 4/1998 |
| EP | 1279680 A2 | 1/2003 |
| EP | 2754673 A1 | 7/2014 |
| EP | 3219734 A1 | 9/2017 |
| EP | 3309179 A1 | 4/2018 |
| EP | 3449738 A1 | 3/2019 |
| JP | 2007189950 | 8/2007 |
| JP | 2014-050326 | 3/2014 |
| JP | 2018-157805 | 10/2018 |
| KR | 20140065177 | 5/2014 |
| WO | 1997/045124 A1 | 12/1997 |
| WO | 2012/051035 A1 | 4/2012 |
| WO | WO-2012173838 A1 * | 12/2012 ............. A23L 11/07 |
| WO | 2013154607 | 10/2013 |
| WO | 2014/063327 A1 | 5/2014 |
| WO | 2014/168914 | 10/2014 |

OTHER PUBLICATIONS

Office Action from JPO—Patent Application No. JP2019-148194 Date of Drafting: Apr. 22, 2022.
Mathis et al., Food Hydrocolloids, 2017, vol. 71, pp. 129-140.
Nagura et al, "Temperature-Viscosity Relationships of Aqueous Solutions of Cellulose Ethers," Kobunshi Ronbunshu, vol. 38, No. 3, pp. 133-137 (Mar. 1981).
Office Action from CNIPA (English machine translation of Office Action), Patent Application No. CN202010788206.0 Date of Drafting: Oct. 19, 2023.
Apr. 2, 2025 Communication of a Notice of Opposition issued in European Patent No. 3772286.
Apr. 14, 2025 Communication of a Notice of Opposition issued in European Patent No. 3772286.
Perez et al., "Dynamics of adsorption of hydroxypropyl methylcellulose at the air-water interface," Food Hydrocolloids, vol. 22, pp. 387-402, 2008.
Perez et al., "Thermodynamic and Dynamic Characteristics of Hydroxypropylmethylcellulose Adsorbed Films at the Air-Water Interface," Biomacromolecules, vol. 7, No. 1, pp. 388-393, 2006.
Experiment Report, Joshua Katz and Sharana Cook, Feb. 25, 2025, 3 pages.
Data Sheet, LOTTE Fine Chemical Co., Ltd., AnyAddy® (Hydroxypropyl methylcellulose), 4 pages, Aug. 19, 2020.
Extended European Search Report of corresponding EP patent application, Jan. 12, 2021
Huc-Mathis, Delphine, et al. "Multiscale evaluation from one bubble to the foam of surface active properties of cellulose derivatives used for a starchy model sponge cake." Food Hydrocolloids 71 (2017): 129-140.

* cited by examiner

*Primary Examiner* — Felicia C Turner
(74) *Attorney, Agent, or Firm* — Oliff PLC

(57) ABSTRACT

The objective of the present invention is to provide a composition for aerosol food product that, even when the composition is foamed by using an espuma, can achieve a favorable state of the resulting foam, thereby rendering the obtained aerosol food product desirably palatable. The objective is achieved by a composition for aerosol food product, comprising hydroxypropyl methylcellulose and water, wherein a ratio of interfacial elastic modulus to interfacial viscous modulus of the hydroxypropyl methylcellulose is equal to or higher than 2.0 when measured with a tensiometer at 25° C. using a 0.2% by mass aqueous solution, and the like.

6 Claims, No Drawings

COMPOSITION FOR AEROZOL FOOD PRODUCT, HYDROXYPROPYL METHYLCELLULOSE, AND METHOD OF PRODUCING HYDROXYPROPYL METHYLCELLULOSE

CROSS-REFERENCE TO RELATED APPLICATION

Benefit is claimed to Japanese Patent Application No. JP2019-148194, filed Aug. 9, 2019, the contents of which are incorporated by reference herein in their entirety.

TECHNICAL FIELD

The present invention relates to a composition for an aerosol food product, hydroxypropyl methylcellulose and a method of producing the hydroxypropyl methylcellulose.

BACKGROUND ART

Milk, fresh cream, foamable oil-in-water-type emulsion compositions, sauces and other food materials can be foamed by using cooking methods with a pressure-resistant cooking apparatus called an espuma (Patent Document 1). For example, aerosol food products obtained by foaming various sauces, soups, condiments and other food materials can provide improved mixing with food materials to which aerosol food products are applied, result in less aerosol food products pooled at the bottom of dish, provide enhanced textures upon eating, and prevent overuse of the aerosol food products. For these reasons, demands for the aerosol food products are increasing in recent years (Patent Document 2).

CITATION LIST

Patent Documents

Patent Document 1: JP 2018-157805 A
Patent Document 2: JP 2014-050326 A

SUMMARY OF THE INVENTION

Problems to be Solved by the Invention

However, generally, aerosol food products prepared through pressurizing and depressurizing processes using a pressurized gas within an espuma container tend to have excessively high overrun as compared to foamed food products prepared by mechanical mixing using a mixer or other apparatus. Such aerosol food products also tend to have an undesirable state of the foam resulting from the foaming process, which may lead to decreased palatability of the aerosol food products.

Accordingly, it is an objective of the present invention to provide a composition for aerosol food product that, even when the composition is foamed by using an espuma, can achieve a favorable state of the resulting foam, thereby rendering the obtained aerosol food product desirably palatable. It is another objective of the present invention to provide hydroxypropyl methylcellulose that can be used to produce such a composition for aerosol food product, as well as a method of producing the hydroxypropyl methylcellulose.

Means of Solving the Problems

In the course of extensive efforts to find a way to solve the above-identified problems, the present inventors have successfully produced hydroxypropyl methylcellulose that has a ratio of interfacial elastic modulus to interfacial viscous modulus of 2.0 or higher, and have found that such hydroxypropyl methylcellulose can be used to obtain a composition for aerosol food product used for producing an aerosol food product that can achieve a favorable state of resulting foam, such as a favorable foam hardness, and desirable palatability, such as rich flavor (i.e., richness), even when the composition is foamed by using an espuma. Based on the above findings, the present inventors have successfully invented a composition for aerosol food product that contains hydroxypropyl methylcellulose having a ratio of interfacial elastic modulus to interfacial viscous modulus of 2.0 or higher, as well as the hydroxypropyl methylcellulose and a method of producing the hydroxypropyl methylcellulose. As such, the present invention has been completed based on the findings and successful examples obtained first by the present inventor.

According to the present invention, there is provided a composition for aerosol food product, hydroxypropyl methylcellulose, and a method of producing the hydroxypropyl methylcellulose in the following aspects:

[1] a composition for aerosol food product, containing hydroxypropyl methylcellulose and water, wherein a ratio of interfacial elastic modulus to interfacial viscous modulus of the hydroxypropyl methylcellulose is equal to or higher than 2.0 when measured with a tensiometer at 25° C. using a 0.2% by mass aqueous solution;

[2] the composition according to [1], wherein the interfacial elastic modulus of the hydroxypropyl methylcellulose is in a range between 10.0 mN/m and 210.0 mN/m;

[3] the composition according to [1] or [2], wherein the interfacial viscous modulus of the hydroxypropyl methylcellulose is in a range between 5.0 mN/m and 35.0 mN/m;

[4] the composition according to any one of [1] to [3], wherein the viscosity of the hydroxypropyl methylcellulose is in a range between 5.5 mPa·s and 1000.0 mPa·s when measured with a viscometer at 20° C. using a 2% by mass aqueous solution;

[5] the composition according to any one of [1] to [4], wherein the aerosol food product is selected from the group consisting of dairy products, liquid condiments, beverages and sauces for sweets;

[6] the composition according to [5], wherein the dairy product is selected from the group consisting of whipped cream, whipped cheese and yogurt;

[7] the composition according to [5], wherein the liquid condiment is selected from the group consisting of dressings, Ponzu sauces, Tare sauces, Soup bases, Dashi stocks and Worcestershire sauces;

[8] a hydroxypropyl methylcellulose having a ratio of interfacial elastic modulus to interfacial viscous modulus of equal to or higher than 2.0 when measured with a tensiometer at 25° C. using a 0.2% by mass aqueous solution;

[9] a method of producing hydroxypropyl methylcellulose, including bringing pulp into contact with an alkali metal hydroxide solution to obtain alkali cellulose;
conducting an etherification reaction using the alkali cellulose, a methylating agent and a hydroxypropylating agent to obtain a crude product of hydroxypropyl methylcellulose;
washing the crude product of the hydroxypropyl methylcellulose to obtain washed hydroxypropyl methylcellulose; and simultaneously pulverizing and drying the washed hydroxypropyl methylcellulose using a gas flow impact type pulverizer to obtain powdered hydroxypropyl methylcellulose;

wherein the method further includes at least one step selected from the group consisting of subjecting the alkali cellulose to a depolymerization process, subjecting the crude product of the hydroxypropyl methylcellulose to a depolymerization process, and subjecting the powdered hydroxypropyl methylcellulose to a depolymerization process; and

[10] the method according to [9], wherein obtaining the powdered hydroxypropyl methylcellulose includes simultaneously pulverizing and drying the washed hydroxypropyl methylcellulose using a gas at 60° C. or above in a gas flow impact type pulverizer to obtain the powdered hydroxypropyl methylcellulose.

Effects of the Invention

According to the present invention, an aerosol food product can be obtained, which has a favorable state of the resulting foam, such as a favorable foam hardness, and desirable palatability, such as rich flavor, even when the aerosol food product is prepared by using an espuma. The aerosol food product is also expected to have improved rich-flavor, water separation, mouthfeel, gloss and chipping when the aerosol food product is based on whipped cream, whipped cheese, yogurt and other dairy products. In addition, the aerosol food product is expected to further have improved rich-flavor, foam stability and foam fineness when the aerosol food product is based on liquid condiments such as dressing, Ponzu sauce, Tare sauce, Soup bases, Dashi stock and Worcestershire sauce, beverages, and sauces for sweets.

DESCRIPTION OF EMBODIMENTS

While a composition for aerosol food product, hydroxypropyl methylcellulose (hereinafter referred to also as "HPMC") and a method of producing the HPMC that form one embodiment of the present invention will now be described in detail, the present invention may take various forms to the extent that its objective can be achieved.

Unless otherwise specified, each term used herein is used in the meaning commonly used by those skilled in the art and should not be construed to have any meaning that is unduly limiting. Also, any speculations and theories herein are made on the basis of the knowledge and experiences of the present inventors and as such, the present invention is not bound by any such speculations and theories.

The terms used herein and also used in "Ministerial Ordinance on Milk and Milk products Concerning Compositional Standards, etc." (Japanese Ministry of Health, Labor and Welfare Ordinance No. 106, 2018, also referred to as "Milk and etc. ordinance," hereinafter) are construed as described in the Milk and etc. ordinance.

The term "and/or" as used herein means either any one of, any combination of two or more of, or combination of all of listed related items.

The term "content" as used herein is equivalent to "concentration" and means the proportion of a component relative to the total amount of a composition containing the component. Unless otherwise specified, the unit of content herein indicates % by mass or "wt %." It should be noted, however, that the total amount of the contents of components do not exceed 100 wt %.

The wording "to" for indicating a range of values is intended to include values preceding and following the symbol; for example, "0 wt % to 100 wt %" means a range from 0 wt % or more and 100 wt % or less.

The number of digits of an integer equals to its significant figure. For example, 1 has one significant figure and 10 has two significant figures. For a decimal number, the number of digits after a decimal point equals to its significant figure. For example, 0.1 has one significant figure and 0.10 has two significant figures.

As used herein, "aerosol food product" refers to a food product obtained, for example, by a cooking method called espuma in which a food material and a pressurized gas are placed in a pressure-resistant container and pressure is released to cause the gas present in the food material to expand thereby rendering the food material foamed. The composition for aerosol food product in one embodiment of the present invention is a composition used for producing aerosol food products. It should be noted, however, that use of the composition in one embodiment of the present invention does not exclude foaming the composition in one embodiment of the present invention by methods other than espuma.

The composition in one embodiment of the present invention comprises at least hydroxypropyl methylcellulose and water, wherein a ratio of interfacial elastic modulus (E') to interfacial viscous modulus (E") of the hydroxypropyl methylcellulose is equal to or higher 2.0 when measured with a tensiometer at 25° C. using a 0.2% by mass aqueous solution.

After repeated trials and failures, the present inventors have directed their attention to the interfacial viscous modulus (E") and the interfacial elastic modulus (E') of an aqueous solution of HPMC. The interfacial viscous modulus (E") corresponds to an index of viscosity term in viscoelasticity of an aqueous solution of HPMC. The interfacial elastic modulus (E') corresponds to an index of elasticity term in viscoelasticity of an aqueous solution of HPMC. It is believed that in relation to continuous foam generated continuously from a composition containing HPMC, the interfacial elastic modulus (E') affects the elasticity (hardness) of the foam surface while the interfacial viscous modulus (E") affects the viscosity (buffering force) of the foam surface. Surprisingly, when the composition for aerosol food product containing HPMC having a ratio (E'/E") of interfacial elastic modulus (E') to interfacial viscous modulus (E") of 0.2 wt % aqueous solution at 25° C. of 2.0 or higher is foamed, the aerosol food product having the following properties is obtained: having stable foam in continuous foam; and favorable palatability, such as rich flavor.

The interfacial viscous modulus (E") and the interfacial elastic modulus (E') of 0.2 wt % aqueous HPMC solution at 25° C. can be measured by using Tracker S tensiometer available from Teclis. Preparation of 0.2 wt % aqueous HPMC solution, measurements of the interfacial viscous modulus (E") and the interfacial elastic modulus (E'), and calculation of their ratio (E'/E") are performed as described in Examples below.

The ratio (E'/E") of the interfacial elastic modulus (E') to the interfacial viscous modulus (E") of 0.2 wt % aqueous HPMC solution at 25° C. may be any value higher than or equal to 2.0, for example, from 2.0 to 10.0. Taking into consideration the probability of ensuring desirable state and favorable palatability of continuous foam generated by foaming the composition for aerosol food product, the ratio is preferably from 2.0 to 8.0, and more preferably from 2.0 to 6.0, and still more preferably from 3.0 to 6.0. When the composition for aerosol food product obtained by using HPMC having the E'/E" ratio of less than 2.0 is foamed, the resulting continuous foam does not have sufficient foam film stability and are thus susceptible to bursting during or after the generation of the continuous foam, so that the resulting aerosol food product tends to exhibit light texture with less rich flavor.

As long as the ratio (E'/E") of the interfacial elastic modulus (E') to the interfacial viscous modulus (E") of 0.2 wt % aqueous HPMC solution at 25° C. is higher than or equal to 2.0, the value of each of the interfacial elastic modulus (E') and the interfacial viscous modulus (E") is not particularly limited. However, the interfacial viscous modulus (E") of 0.2 wt % aqueous HPMC solution at 25° C. is preferably from 5.0 mN/m to 35.0 mN/m, more preferably from 10.0 mN/m to 30.0 mN/m, and still more preferably from 14.0 mN/m to 25.0 mN/m in terms of foamability and foam film equilibrium of the continuous foam generated by foaming the composition for aerosol food product. The interfacial elastic modulus (E') of 0.2 wt % aqueous HPMC solution at 25° C. is preferably from 10.0 mN/m to 210.0 mN/m, more preferably from 20.0 mN/m to 140.0 mN/m, and still more preferably from 30.0 mN/m to 105.0 mN/m in terms of foam film stabilization of the continuous bubbles generated by foaming the composition for aerosol food product.

It is preferable that HPMC has advantageous properties as a component of the composition for aerosol food product. For example, the viscosity of 2.0 wt % aqueous HPMC solution at 20° C. is preferably from 5.5 mPa·s to 1000.0 mPa·s, more preferably from 6.0 mPa·s to 800.0 mPa·s, and still more preferably from 6.3 mPa·s to 500.0 mPa·s in terms of control of the viscosity of the composition for aerosol food product.

For viscosity values equal to or above 600 mPa·s, the viscosity of 2.0 wt % aqueous HPMC solution at 20° C. can be measured by using a single cylinder-type rotational viscometer according to "2. Method II Viscosity measurement by rotational viscometer" in the Viscosity Determination in General Tests described in Japanese Pharmacopoeia, 17th edition. On the other hand, for viscosity values less than 600 mPa·s, the viscosity of 2.0 wt % aqueous HPMC solution at 20° C. can be measured using a Ubbelohde-type viscometer according to "1. Method I Viscosity measurement by capillary tube viscometer" in the Viscosity Determination in General Tests described in Japanese Pharmacopoeia, 17th edition, as described in Examples below.

The DS of methoxy groups in HPMC is preferably from 1.00 to 2.20, more preferably from 1.40 to 2.00, and still more preferably from 1.60 to 1.95 in terms of the surface-active effect. "DS" of methoxy groups in HPMC represents a degree of substitution, which is the average number of methoxy groups per unit of anhydrous glucose.

The MS of hydroxypropoxy groups in HPMC is preferably from 0.10 to 0.60, and more preferably from 0.15 to 0.35 in terms of the surface-active effect. "MS" of hydroxypropoxy groups in HPMC represents a molar substitution, which is the average number of moles of hydroxypropoxy groups per mole of anhydrous glucose.

DS of methoxy groups and MS of hydroxypropoxy groups in HPMC are the values determined by converting the values measured by the measurement method for Hydroxypropyl Methylcellulose described in Japanese Pharmacopoeia, 17th edition.

As long as HPMC that a ratio (E'/E") of the interfacial elastic modulus (E') to the interfacial viscous modulus (E") is equal to or higher than 2.0 when measured with a tensiometer at 25° C. using a 0.2% by mass aqueous solution can be obtained, HPMC can be obtained by any method that is not particularly limited. Such HPMC can be produced by, for example, an HPMC production method, including at least bringing pulp into contact with an alkali metal hydroxide solution to obtain alkali cellulose; conducting an etherification reaction using the alkali cellulose, a methylating agent and a hydroxypropylating agent to obtain a crude product of HPMC; washing the crude product of HPMC to obtain washed HPMC; and simultaneously pulverizing and drying the washed HPMC using a gas flow impact type pulverizer to obtain powdered HPMC (wherein the method also includes at least one step selected from the group consisting of subjecting the alkali cellulose to a depolymerization process, subjecting the crude product of hydroxypropyl methylcellulose to a depolymerization process, and subjecting the powdered hydroxypropyl methylcellulose to a depolymerization process).

First, pulp is brought into contact with an alkali metal hydroxide solution to obtain alkali cellulose.

Examples of the pulp include cellulose pulp such as wood pulp and linter pulp and the like.

Examples of the alkali metal hydroxide solution include aqueous solutions of alkali metal hydroxides, such as an aqueous sodium hydroxide solution and an aqueous potassium hydroxide solution.

Preferably, the concentration of the alkali metal in the alkali metal hydroxide solution is from 10 wt % to 60 wt % in terms of economics and ease of handling.

While the amount of the alkali metal hydroxide solution employed may be properly determined based on the DS of methoxy groups and the MS of hydroxypropoxy groups of HPMC to be produced, the amount is preferably from 0.30 parts by mass to 3.00 parts by mass with respect to the unit parts by mass (i.e., 1.00 parts by mass) of pulp.

The contact of the pulp and the alkali metal hydroxide solution may be achieved by using, for example, a reactor equipped with an internal stirrer.

Preferably, the alkali cellulose is subjected to depolymerization by oxygen before being subjected to the subsequent etherification reaction to obtain depolymerized alkali cellulose.

Oxygen may be supplied, for example, by passing an air stream through the reactor.

While the amount of oxygen supplied may be properly determined depending on the viscosity of desired HPMC, the reaction temperature and the reaction time during the depolymerization, the amount of oxygen already present in the reactor prior to the supply of oxygen and other conditions, it is preferably 0.1 g or more, and more preferably from 0.5 g to 20 g, per 1 kg of solid components in the pulp.

The solid components in the pulp means components present in the pulp other than water. The solid components in the pulp may include organic substances, such as cellulose, which is the major component, hemicellulose, lignin and resin components, as well as inorganic substances, such as Si components and Fe components.

The solid components in the pulp can be calculated by the dry matter content determined by the Pulps-Determination of Dry Matter Content according to JIS P8203:1998. The dry matter content is the ratio of the mass of sample when dried at 105±2° C. so as to reach a constant mass to the mass of sample before dried, and is expressed by wt %.

The reaction temperature for the depolymerization by oxygen is preferably from 20° C. to 100° C., more preferably from 30° C. to 90° C., and still more preferably from 40° C. to 90° C.

While the reaction time for the depolymerization by oxygen may be properly determined depending on the temperature, it is preferably from 5 min to 2 hours.

Next, an etherification reaction using the alkali cellulose, a methylating agent and a hydroxypropylating agent is conducted to obtain a crude product of HPMC.

The methylating agent includes methyl chloride. The hydroxypropylating agent includes propylene oxide.

The used amounts of the methylating agent and the hydroxypropylating agent may be properly determined depending on their respective degrees of substitution (DS) and molar substitutions (MS) in HPMC. Preferably, from 0.5 parts by mass to 3.0 parts by mass of the methylating agent and from 0.05 parts by mass to 3.0 parts by mass of the hydroxypropylating agent are used for 1.0 part by mass of pulp.

The reaction temperature for the etherification reaction is preferably from 40° C. to 100° C. The reaction time for the etherification reaction is preferably from 1 hour to 5 hours.

Next, the crude product of HPMC is washed to obtain washed HPMC. When the alkali cellulose is not depolymerized by oxygen, the crude product of HPMC is preferably subjected to a depolymerization process by acid as described below, prior to the washing.

The washing may be performed using water. The temperature of water for the washing is preferably from 85° C. to 100° C. The moisture content in the washed HPMC is preferably from 25 wt % to 95 wt % to facilitate removal of impurities and adjustment of the moisture content during the subsequent step. The moisture content in the washed HPMC may be determined according to "Loss on Drying Test" in Japanese Pharmacopoeia, 17th edition.

Next, the washed HPMC is simultaneously pulverizing and dried using a gas flow impact type pulverizer to obtain powdered HPMC.

The moisture content in the washed HPMC for loading onto the gas flow impact type pulverizer is preferably from 25 wt % to 95 wt %, more preferably form 50 wt % to 80 wt %, and still more preferably from 60 wt % to 70 wt %. The moisture content in the washed HPMC may be determined according to "Loss on Drying Test" in Japanese Pharmacopoeia, 17th edition. If necessary, water may be added to the washed HPMC to adjust the moisture content.

The temperature of the washed HPMC for loading onto the gas flow impact type pulverizer is preferably from 5° C. to 60° C., more preferably from 20° C. to 30° C. The gas to be supplied to the gas flow impact type pulverizer includes air, nitrogen gas and mixed gases thereof. The gas may be supplied to the gas flow impact type pulverizer by using, for example, a blower. The temperature of the gas to be supplied to the gas flow impact type pulverizer is preferably from 10° C. to 160° C., more preferably from 40° C. to 140° C., and still more preferably from 60° C. to 130° C.

By simultaneously pulverizing and drying using a gas flow impact type pulverizer, powdered HPMC is obtained. The moisture content in the powdered HPMC is preferably from 0.8 wt % to 2.0 wt %. The moisture content in the powdered HPMC may be determined according to "Loss on Drying Test" in Japanese Pharmacopoeia, 17th edition.

If the alkali cellulose and/or the crude product of HPMC are not subjected to the depolymerization process, the viscosity of the resulting powdered HPMC in the above-described method may become significantly larger. In such a case, the resulting powdered HPMC may be subjected to, for example, depolymerization by acid to adjust the viscosity of the 2 wt % aqueous solution at 20° C. to a suitable range.

The depolymerization by acid may be performed according to a known method. Examples of the acid include hydrogen halide such as hydrogen chloride. The acid may be used as an aqueous solution, for example. For example, hydrogen chloride may be used as hydrochloric acid (aqueous hydrogen chloride solution). The concentration of hydrogen chloride in the aqueous hydrogen chloride solution is preferably from 1 wt % to 45 wt %.

The amount of acid used is preferably from 0.04 parts by mass to 1 part by mass with respect to 100 parts by mass of HPMC. The reaction temperature for the depolymerization by acid is preferably from 40° C. to 85° C. The reaction time for the depolymerization by acid is preferably from 0.1 hours to 4 hours.

After completion of the depolymerization by an acid, the acid may be removed by reducing the pressure inside the reactor, for example. Alternatively, sodium bicarbonate may be added as necessary to neutralize the acid used for depolymerization.

While the amount of HPMC is not particularly limited and may be any amount that can achieve the desirable state of the foam obtained by foaming the composition for the aerosol food product using an espuma, the amount is, for example, from 0.001 wt % to 10 wt %. Taking into consideration the foam property and thickening ability of the resulting aerosol food product, the amount is preferably from 0.001 wt % to 2.0 wt %, and more preferably from 0.01 wt % to 1.0 wt %.

The water is not particularly limited and may be any type of water commonly used for the composition for aerosol food product, including, for example, tap water and purified water. The amount of water may be properly determined depending on the type of aerosol food product and is not particularly limited. For example, the amount of water is 1 wt % to 80 wt %.

The aerosol food product is not particularly limited and may be any food product that can be eaten or drunk in the form of foam, including, for example, dairy products, liquid condiments, beverages, and sauces for sweets. Non-limited specific examples of these food products will now be described below for illustrative purposes.

Specific examples of the dairy products include whipped cream, whipped cheese, and yogurt. Specific examples of the liquid condiments include dressings, Ponzu sauces, Tare sauces, Soup bases, Dashi stocks, and Worcestershire sauces. Specific examples of the beverages include alcohol beverages, fruit juices, tea beverages, sports drinks, soft drinks, coffee, milk, homogenized milk, and skim milk. Specific examples of the sauces for sweets include fruit sauces, chocolate sauces, caramel sauces, snow cone syrups and condensed milk.

As long as the composition for aerosol food product contains at least HPMC having a ratio of interfacial elastic modulus (E') to interfacial viscous modulus (E") of 2.0 or higher and water, the composition may further contain other components. Accordingly, the composition for aerosol food product can take a suitable form for a desired food product.

Other components include, but are not limited to, oils, non-fat solids, sweeteners, emulsifying agents, thickening agents, flavors, preservative agents, anti-oxidant agents, vitamins, minerals, and seasoning agents. Other components may be used either individually or in combination of two or more of such components. The source of other components is not particularly limited; for example, commercially available products may suitably be used. Non-limited specific examples of other components will now be described below for illustrative purposes.

The fats and oils may include vegetable oils (vegetable fats), and milk fats derived from milks of animals such as cows and goats.

Specific examples of vegetable oils include coconut oil, palm oil, soybean oil, canola oil, cottonseed oil, corn oil, sunflower oil, olive oil, safflower oil, kapok oil, palm seed oil, margarines, and shortenings, and may further include their fractionated oils, hydrogenated oils, and transesterified oils.

Specific examples of non-fat solids include non-fat milk solids obtained by removing water and milk fat from cow milk and goat milk. The non-fat milk solids may contain proteins, carbohydrates, minerals, and vitamins present in milk.

The sweeteners includes sugar alcohols, such as maltitol, erythritol, solbitol, palatinit, xylitol, lactitol, and isomaltitol; aspartame, acesulfame potassium, sucralose, alitame, neotame, Kanzo extracts (glycyrrhizin), saccharin, saccharin sodium, stevia extracts, stevia powder, sucrose, white sugar, glucose, fructose, isomerized sugar, invert sugar; oligosaccharides, such as isomaltooligosaccharide, reduced xylooligosaccharide, reduced gentiooligosaccharide, xylooligosaccharide, gentiooligosaccharide, nigerooligosaccharide, teandeoligosaccharide, and soybean oligosaccharide; trehalose, starch syrup, reduced starch syrup, and honey.

The emulsifying agents include monoglyceride fatty acid esters, polyglyceride fatty acid esters, diglyceride fatty acid esters, sorbitan fatty acid esters, and lecithin.

The thickening agents include methyl cellulose, hydroxypropyl cellulose, agar, gelatin, carrageenan, xanthan gum, locust bean gum, gellan gum, and pectin.

The flavors include vanilla flavor and milk flavor.

The preservative agents include sodium methaphosphate, alkali metal salts of citric acid, and alkali metal salts of phosphoric acid.

The anti-oxidant agents include tocopherols and tea extracts.

The vitamins include vitamin $B_1$, ascorbic acid, and pantothenic acid.

The minerals include potassium, sodium, and calcium.

The seasoning agents include salt, vinegar, mayonnaise, miso, mirin, soy sauce, amino acids (such as glycine, alanine, and sodium glutamate), nucleic acid-based seasonings (such as sodium inosinate, and sodium guanylate), organic acid-based seasonings (such as sodium succinate), fruit juices, proteins, and spices.

A specific embodiment of the present invention is a composition for aerosol dairy product. The composition for aerosol dairy product contains at least HPMC having a ratio of interfacial elastic modulus (E') to interfacial viscous modulus (E") of 2.0 or higher, an oil, a non-fat milk solid, and water. However, the only foaming method for the composition for aerosol dairy product is through aerosol.

The amount of HPMC in the composition for aerosol dairy product is preferably from 0.001 wt % to 2.0 wt %, more preferably from 0.005 wt % to 1.0 wt %, and still more preferably from 0.01 wt % to 0.5 wt % in terms of foamability and thickening ability.

The amount of the oil in the composition for aerosol dairy product is preferably from 5.0 wt % to 60.0 wt %, more preferably from 10.0 wt % to 50.0 wt %, and still more preferably from 15.0 wt % to 45.0 wt % in terms of taste and mouthfeel.

The amount of the non-fat milk solid in the composition for aerosol dairy product is preferably from 0.001 wt % to 10.0 wt %, more preferably from 0.005 wt % to 5.0 wt % in terms of taste.

The amount of water in the composition for aerosol dairy product is preferably from 28.0 wt % to 94.998 wt %, more preferably from 30.0 wt % to 75.0 wt % in terms of shape retention of the aerosol dairy product.

The viscosity at 5° C. of the composition for aerosol dairy product is preferably from 10.0 mPa·s to 2000.0 mPa·s, more preferably from 10.0 mPa·s to 1000.0 mPa·s, and still more preferably from 10.0 mPa·s to 100.0 mPa·s in terms of dispensability and workability.

The viscosity at 5° C. of the composition for aerosol dairy product is a value measured using a rheometer according to the method described in Examples below.

A sweetener may be further added to the composition for aerosol dairy product.

The amount of the sweetener in the composition for aerosol dairy product is preferably from 0.1 wt % to 15.0 wt % in terms of taste.

Another specific embodiment of the present invention is an aerosol liquid condiment composition. The aerosol liquid condiment composition contains at least HPMC having a ratio of interfacial elastic modulus (E') to interfacial viscous modulus (E") of 2.0 or higher, an oil, and water.

The amount of HPMC in the aerosol liquid condiment composition is preferably from 0.01 wt % to 3.0 wt %, more preferably from 0.05 wt % to 2.0 wt %, and still more preferably from 0.05 wt % to 1.0 wt % in terms of foamability and thickening ability.

The amount of the oil in the aerosol liquid condiment composition is preferably from 0.001 wt % to 90.0 wt %, more preferably from 0.01 wt % to 80.0 wt %, and still more preferably from 0.1 wt % to 65.0 wt % in terms of taste.

The amount of water in the aerosol liquid condiment composition is preferably from 1.0 wt % to 99.989 wt %, more preferably from 7.0 wt % to 80.0 wt %, and still more preferably from 10.0 wt % to 50.0 wt % in terms of shape retention of the aerosol liquid condiment.

A seasoning agent may be further added to the aerosol liquid condiment composition.

The amount of the seasoning agent in the aerosol liquid condiment composition is preferably from 0.1 wt % to 60.0 wt %, more preferably from 0.1 wt % to 50.0 wt % in terms of taste.

A sweetener may be further added to the aerosol liquid condiment composition.

The amount of the sweetener in the aerosol liquid condiment composition is preferably from 0.1 wt % to 20.0 wt %, more preferably from 0.1 wt % to 10.0 wt % in terms of taste.

The viscosity at 5° C. of the aerosol liquid condiment composition is preferably from 5.0 mPa·s to 500.0 mPa·s, more preferably from 10.0 mPa·s to 300.0 mPa·s, and still more preferably from 50.0 mPa·s to 250.0 mPa·s in terms of dispensability and workability.

The viscosity at 5° C. of the aerosol liquid condiment composition is a value measured using a rheometer according to the method described in Examples below.

The composition for aerosol food product can be produced by the step of mixing HPMC, water, and any other components appropriately selected for a desired food product to obtain the composition for aerosol food product.

While the manner in which the components of the composition for aerosol food product are mixed together is not particularly limited, the mixing may be achieved by using a mixer under conditions that do not cause foaming of the composition as vigorous mixing may cause such foaming. However, due to the solubility of HPMC, it is preferred to first mix HPMC with water to obtain an aqueous HPMC solution and subsequently mix the aqueous HPMC solution, water, and optional other components appropriately selected for a desired food product. The oil, the non-fat milk solid, and the optional other components may be, as a pre-mixture thereof, commercially available creams and compounds.

The composition for aerosol food product may be prepared as a packaged composition for aerosol food product packaged and sealed in a container. The container is not particularly limited; for example, packages formed of materials including paper, plastics such as PET and PTP, glass, and metals such as aluminum may be used. The packaged composition for aerosol food product can be sold and distributed by itself as an individual package. The composition for aerosol food product may be sterilized before or after packaging.

The composition for aerosol food product may be used in any suitable manner that is not particularly limited to produce an aerosol food product; for example, the aerosol food product may be obtained from the composition for aerosol food product by a filling step of filling a pressurized gas in an espuma container containing the composition for aerosol food product so as to pressurize the espuma container, and a dispensing step of dispensing the composition for aerosol food product from the espuma container by releasing the pressure.

The pressurized gas used in the filling step includes nitrous oxide gas, carbon dioxide gas and nitrogen gas.

The internal pressure of the container during the filling step is preferably from 0.4 MPa to 1.0 MPa at 25° C. in terms of dispensability and foamability.

The espuma container may be shaken for 10 seconds to 30 seconds before the dispensing step in order to form uniform foam.

The aerosol food product obtained by foaming the composition for aerosol food product in one embodiment of the present invention achieves a favorable state of foam and desirable palatability, such as rich flavor, even when the product is prepared by using an espuma. For example, the aerosol food product obtained by foaming the composition for aerosol food product in one embodiment of the present invention has a much favorable foam state and much favorable rich flavor as compared to aerosol food products obtained under the same condition, but by foaming a composition containing HPMC having a ratio of interfacial elastic modulus (E') to interfacial viscous modulus (E") of 0.2 wt % aqueous solution at 25° C. of less than 2.0 in place of the HPMC having the ratio of 2.0 or higher.

Another embodiment of the present invention is a hydroxypropyl methylcellulose having a ratio of interfacial elastic modulus to interfacial viscous modulus of 0.2 wt % aqueous solution at 25° C. of 2.0 or higher.

Another embodiment of the present invention is a method of producing hydroxypropyl methylcellulose, including the steps of bringing pulp into contact with an alkali metal hydroxide solution to obtain alkali cellulose; conducting an etherification reaction using the alkali cellulose, a methylating agent and a hydroxypropylating agent to obtain a crude product of hydroxypropyl methylcellulose; washing the crude product of the hydroxypropyl methylcellulose to obtain washed hydroxypropyl methylcellulose; and simultaneously pulverizing and drying the washed hydroxypropyl methylcellulose using a gas flow impact type pulverizer to obtain powdered hydroxypropyl methylcellulose.

The production method in one embodiment of the present invention includes one, two or three of any of the steps of subjecting the alkali cellulose to a depolymerization process, subjecting the crude product of hydroxypropyl methylcellulose to a depolymerization process, and subjecting the powdered hydroxypropyl methylcellulose to a depolymerization process. Specifically, the production method in one embodiment of the present invention is characterized in that HPMC in a wet state is simultaneously pulverized and dried using a gas flow impact type pulverizer and in that alkali cellulose and/or HPMC is depolymerized.

In order to stably obtain hydroxypropyl methylcellulose having a ratio of interfacial elastic modulus to interfacial viscous modulus of 0.2 wt % aqueous solution at 25° C. of 2.0 or higher, the production method in one embodiment of the present invention preferably includes t subjecting alkali cellulose to a depolymerization process, and more preferably includes subjecting alkali cellulose to a depolymerization process using oxygen.

In order to stably obtain hydroxypropyl methylcellulose having a ratio of interfacial elastic modulus to interfacial viscous modulus of 0.2 wt % aqueous solution at 25° C. of 2.0 or higher, the production method in one embodiment of the present invention preferably includes simultaneously drying and pulverizing hydroxypropyl methylcellulose using a gas flow impact type pulverizer using a gas at 60° C. or above.

Based on the properties of the aerosol food product obtained from the above-described composition for aerosol food product, the following embodiments of the invention are provided as another aspect of the present invention:

a composition for stabilized aerosol food, containing hydroxypropyl methylcellulose having a ratio of interfacial elastic modulus to interfacial viscous modulus of 0.2 wt % aqueous solution at 25° C. of 2.0 or higher, and water; and a method for stabilizing an aerosol food product, the method including using the composition;

a composition for improving water separation of aerosol food product containing hydroxypropyl methylcellulose having a ratio of interfacial elastic modulus to interfacial viscous modulus of 0.2 wt % aqueous solution at 25° C. of 2.0 or higher, and water; and a method for improving water separation of an aerosol food product, the method including using the composition; and a composition for improving foam hardness of aerosol food product containing hydroxypropyl methylcellulose having a ratio of interfacial elastic modulus to interfacial viscous modulus of 0.2 wt % aqueous solution at 25° C. of 2.0 or higher, and water; and a method for improving foam hardness of an aerosol food product, the method including using the composition.

EXAMPLES

While the present invention will now be described in further detail with reference to Synthesis Examples, Examples and Comparative Examples, the present invention is not limited to these Synthesis Examples and Examples.
<Preparation of HPMC>

Synthesis Example 1: Preparation of HPMC-1

1.98 parts by mass of a 49 wt % aqueous sodium hydroxide solution was sprayed onto 1.00 parts by mass of wood pulp (97 wt % solid components) while the materials were stirred in a reactor equipped with an internal stirrer, to obtain an alkali cellulose.

While the materials were stirred at 70° C., air was then passed through the reactor for 70 min to allow the alkali cellulose to react with oxygen in the air to thereby depolymerize the alkali cellulose.

The amount of supplied oxygen was 2.5 g per kg of the solid components in the wood pulp.

After the space inside the reactor was evacuated to −95 kPa, 1.60 parts by mass of methyl chloride for methoxy group substitution and 0.21 parts by mass of propylene oxide for hydroxypropoxy group substitution were added to the reactor. The reaction was then carried out at temperature of 60° C. to 90° C. for 2 hours to obtain a crude product of HPMC.

The crude product of HPMC was then washed with hot water at 90° C. to obtain washed HPMC having a moisture content of 50 wt %.

Water was then added to the washed HPMC to obtain cooled HPMC having a moisture content of 65 wt % and having a temperature of 25° C. The cooled HPMC was then loaded onto a gas flow impact type pulverizer. Using a blower, a mixed gas of air and nitrogen at 70° C. was sent through the gas flow type pulverizer to simultaneously pulverizing and dry HPMC, thereby obtaining powdered HPMC-1 having a moisture content of 1.2 wt %.

The gas flow impact type pulverizer was "UltraRotor Type II," manufactured by Altenburger Maschinen Jaeckering GmbH, which has a vertically arranged drive shaft, 16 impact plates acting on a pair of engraved pulverizing tracks, and 7 pulverizing tracks each having a diameter of 0.5 mm, and which doesn't have sieves.

The amount of the mixed gas of air and nitrogen was 1,850 m$^3$ per hour (as measured at 70° C.), and the rotating speed of the driving shaft was 4,420 min$^{-1}$.

For the resulting HPMC-1, the ratio (E'/E") of interfacial elastic modulus (E') to interfacial viscous modulus (E"), the interfacial viscous modulus (E"), the interfacial elastic modulus (E'), the viscosity of 2.0 wt % aqueous solution at 20° C., DS of methoxy groups, and MS of hydroxypropoxy groups were determined as described below.

Synthesis Example 2: Preparation of HPMC-2

The preparation of alkali cellulose, the etherification reaction, the washing, the pulverizing and drying were carried out in the same manner as in Synthetic Example 1, except that 2.83 parts by mass of a 49 wt % aqueous sodium hydroxide solution was used, alkali cellulose was not depolymerized, 2.13 parts by mass of methyl chloride was used, 0.53 parts by mass of propylene oxide was used, and a mixed gas of air and nitrogen at 120° C. was sent through the gas flow impact type pulverizer. This resulted in powdered HPMC having a moisture content of 1.2 wt %. The viscosity at 20° C. of 2 wt % aqueous solution of this powdered HPMC was 4,000 mPa·s.

12 wt % hydrochloric acid was then sprayed onto the resulting powdered HPMC in such a manner that 0.3 parts by mass of hydrogen chloride was applied to 100 parts by mass of HPMC. The HPMC sprayed with hydrochloric acid was then reacted for 10 min in a rotating glass reactor at a jacket temperature of 80° C. for depolymerization.

While maintaining the jacket temperature at 80° C., the pressure was reduced to 60 mmHg (8.0 kPa) and left at the pressure for 30 min to evaporate hydrogen chloride and water in the glass reactor.

To the HMPC in the glass reactor, sodium bicarbonate with an amount equivalent to ½ moles of the added hydrogen chloride was then added to neutralize HPMC and to thereby obtain HPMC-2.

For the resulting HPMC-2, the ratio (E'/E") of interfacial elastic modulus (E') to interfacial viscous modulus (E"), the interfacial viscous modulus (E"), the interfacial elastic modulus (E'), the viscosity of 2.0 wt % aqueous solution at 20° C., DS of methoxy groups, and MS of hydroxypropoxy groups were determined.

Synthesis Example 3: Preparation of HPMC-3

The same procedure was carried out as in Synthetic Example 1, except that alkali cellulose was depolymerized by passing air through the reactor for 20 min under stirring at 70° C. This resulted in powdered HPMC-3 having a moisture content of 1.2 wt %.

For the resulting HPMC-3, the ratio (E'/E") of interfacial elastic modulus (E') to interfacial viscous modulus (E"), the interfacial viscous modulus (E"), the interfacial elastic modulus (E'), the viscosity of 2.0 wt % aqueous solution at 20° C., DS of methoxy groups, and MS of hydroxypropoxy groups were determined.

Synthesis Example 4: Preparation of HPMC-4

The preparation of alkali cellulose, the etherification reaction, and the washing were carried out in the same manner as in Synthetic Example 1, except that 2.83 parts by mass of a 49 wt % aqueous sodium hydroxide solution was used, alkali cellulose was not depolymerized, 2.13 parts by mass of methyl chloride was used, and 0.53 parts by mass of propylene oxide was used. This resulted in washed HPMC having a moisture content of 50 wt %.

Water was then added to the washed HPMC to obtain cooled HPMC having a moisture content of 65 wt % and having a temperature of 25° C. The cooled HPMC was air-dried for 10 hours using a blower to obtain dried HPMC having a moisture content of 1.2 wt %.

The dried HPMC was then loaded onto the gas flow impact type pulverizer used in Synthesis Example 1. Using a blower, a mixed gas of air and nitrogen at 20° C. was sent through the gas flow impact type pulverizer to pulverize HPMC, and to thereby obtain powdered HPMC having a moisture content of 1.2 wt %. The viscosity at 20° C. of 2 wt % aqueous solution of this powdered HPMC was 4,000 mPa·s.

The amount of the mixed gas of air and nitrogen was 1,850 m$^3$ per hour (as measured at 20° C.), and the rotating speed of the driving shaft was 4,420 min$^{-1}$.

12 wt % hydrochloric acid was then sprayed onto the resulting powdered HPMC in such a manner that 0.3 parts by mass of hydrogen chloride was applied to 100 parts by mass of HPMC. The HPMC sprayed with hydrochloric acid was then reacted for 70 min in a rotating glass reactor at a jacket temperature of 80° C. for depolymerization.

While maintaining the jacket temperature at 80° C., the pressure was reduced to 60 mmHg (8.0 kPa) and left at the pressure for 30 min to evaporate hydrogen chloride and water in the glass reactor.

To the HMPC in the glass reactor, sodium bicarbonate with the amount equivalent to ½ moles of the added hydrogen chloride was then added to neutralize HPMC and to thereby obtain HPMC-4.

For the resulting HPMC-4, the ratio (E'/E") of interfacial elastic modulus (E') to interfacial viscous modulus (E"), the interfacial viscous modulus (E"), the interfacial elastic modulus (E'), the viscosity of 2.0 wt % aqueous solution at 20° C., DS of methoxy groups, and MS of hydroxypropoxy groups were determined.

<Measurement of Physical Properties of HPMC>

Physical properties of HPMC were measured for HPMC-1 to 4 prepared in Synthesis Examples 1 to 4, measurement by capillary tube viscometer" in the General Tests "Viscosity Determination" described in Japanese Pharmacopoeia, 17th edition.

[Measurement of DS and MS of Cellulose Ether]

MS and DS were converted from the results measured according to the quantification method of hypromellose in Japanese Pharmacopoeia, 17th Edition.

| | Ratio of interfacial elastic modulus (E') to interfacial viscous modulus (E") (E'/E") (—) | Interfacial viscous modulus (E") (mN/m) | Interfacial elastic modulus (E') (mN/m) | Viscosity (mPa · s) (—) | DS (—) | MS (—) |
| --- | --- | --- | --- | --- | --- | --- |
| HPMC-1 | 3.2 | 20.0 | 63.8 | 50.0 | 1.78 | 0.16 |
| HPMC-2 | 2.4 | 14.5 | 34.1 | 50.0 | 1.89 | 0.24 |
| HPMC-3 | 5.3 | 17.9 | 95.1 | 400.0 | 1.78 | 0.16 |
| HPMC-4 | 1.8 | 14.9 | 26.1 | 6.0 | 1.89 | 0.24 |

* In table, HPMC represents hydroxypropyl methylcellulose.

respectively. Methods used for measuring each physical property are described below. The results are shown in Table 1.

[Interfacial Viscous Modulus (E") and Interfacial Elastic Modulus (E')]

Using a tensiometer ("Tracker S" manufactured by Teclis), the values at 25° C. were measured for 0.2 wt % aqueous solution of HPMC as a sample solution.

An amount of HPMC corresponding to 0.6 g of the dried product adjusted for the moisture content was accurately weighed in a jar (diameter: 65 mm, height: 120 mm, volume: 350 ml). To the jar, hot water at 98° C. was added to amount to 300.0 g. The jar was capped and the mixture was stirred for 20 min using a stirrer at 350 rpm to 500 rpm until a uniform dispersion was obtained. Subsequently, the dispersion was stirred for 40 min in a water bath at 0° C. to 5° C. to obtain 0.2 wt % aqueous solution of HPMC as a sample solution.

An 18-gauge needle as a syringe for the rising drop measurement was attached to the tensiometer. The sample measurement unit of the tensiometer was conditioned to 25° C. in advance. The prepared 0.2 wt % aqueous solution of HPMC was poured into a measurement cup (diameter: 25 mm, height: 66 mm, rectangular parallelepiped glass container) to the marked line (25 ml), and measurements were started under the following conditions: While the sample measurement unit of the tensiometer was kept constant at 25° C., data were collected over a period of 100 seconds or longer to obtain a sine wave. With the calculation frequency of 100 seconds, the interfacial viscous modulus (E") and the interfacial elastic modulus (E') were determined and E'/E" was calculated.

Measurement Conditions for Tensiometer:

Period: 10 sec
　Active cycles: 5 cycles
　Blank cycles: 5 cycles
　Injected air: air with a volume of 16.6±0.5 mm$^2$
　Variation intensity (Amplitude): 0.7 mm$^2$

[Viscosity]

2 wt % aqueous solution of HPMC was prepared in a similar manner to the method of preparing 0.2 wt % aqueous solution of HPMC, and the viscosity at 20° C. of 2 wt % aqueous solution of HPMC was measured by using a Ubbelohde-type viscometer according to "1. Method I Viscosity <Production of Aerosol Whipped Cream>

HPMC used as a material was HPMC-1 to -4 prepared in Synthesis Examples 1 to 4. For oil and non-fat solid, a vegetable whipped compound ["Whip Vegetable Fat," containing 40.0 wt % vegetable oil (vegetable fat), 3.50 wt % non-fat solid (non-fat milk solid), 56.5 wt % water (containing additive agents such as stabilizing agents and coloring agents); manufactured by Megmilk Snow Brand] was used. Tap water was used as water. Sucrose ("Mom Brand White Sugar," manufactured by Mitsui Sugar) was used as the sweetener.

Example 1

To 90 g of the vegetable whipped compound, 0.75 g of 4.0 wt % aqueous solution of the prepared HPMC-1 (5° C.), 8.0 g of sucrose, and 1.25 g of water were added, and the mixture was stirred using a magnetic stirrer ("HS-360," manufactured by AS ONE) at 500 rpm to 600 rpm for about 10 min while chilled on ice at 0° C. to 5° C. This resulted in a composition for aerosol whipped cream.

The composition for aerosol whipped cream was then transferred to an espuma container ("Advanced Dispenser S," manufactured by Nippon Tansan Gas), and nitrous oxide gas was filled until the internal pressure of the container reached 0.8 MPa. The espuma container was manually shaken until the composition for aerosol whipped cream lost fluidity (15 seconds). Subsequently, the composition was dispensed at 25° C. from the nozzle to prepare an aerosol whipped cream.

Examples 2 and 3 and Comparative Example 1

A composition for aerosol whipped cream was produced and an aerosol whipped cream was prepared in the same manner as in Example 1, except that HPMC-2 (Example 2) and HPMC-4 (Comparative Example 1) were used in place of HPMC-1, respectively. For Example 3, a composition for aerosol whipped cream was produced and an aerosol whipped cream was formed in the same manner as in Example 1, except that 0.5 g of 4.0 wt % aqueous solution of HPMC-1 (5° C.) and 1.5 g of water were used in place of 0.75 g of 4.0 wt % aqueous solution of HPMC-1 (5° C.) and 1.25 g of water.

<Measurement of Physical Properties of Composition for Aerosol Whipped Cream>

The viscosities of the aerosol whipped cream compositions prepared in Examples 1 to 3 and Comparative Example 1 were measured. The method used for measuring the viscosity is described below. The results are shown in Table 2.

[Viscosity]

The sample measurement unit of a rheometer ("MCR-301," manufactured by Anton Paar) was conditioned to 5° C. in advance, and the composition for aerosol whipped cream immediately after preparation was poured into a CC27 measurement cup (a cylindrical aluminum container with a diameter of 30 mm and a height of 80 mm) to the marked line (25 ml). Measurements were then started with a shear rate of 100 1/s. The measurement unit was kept constant at 5° C. and data were collected once every minute. The shear viscosity measured 10 minutes after the start of the measurement was assigned to be the viscosity of the composition for aerosol whipped cream at 5° C.

<Evaluation of Characteristics of Aerosol Whipped Cream>

As a characteristic property of whipped cream, overrun was evaluated for the aerosol whipped creams prepared in Examples 1 to 3 and Comparative Example 1. The method used for evaluating the overrun is described below. The results of evaluation are shown in Table 2.

[Overrun]

Overrun is a percent (%) increase in the volume immediately after dispensing and is expressed by the following equation: "Weight of composition" in the equation is obtained by filling a composition for aerosol whipped cream to the brim of a 25 ml plastic bottle (bar bottle, manufactured by AS ONE), and weighing the composition filled. Also, "Weight of aerosol whipped cream immediately after dispensed" in the equation is obtained by filling an aerosol whipped cream immediately after dispensed to the brim of a 25 ml plastic bottle (bar bottle, manufactured by AS ONE), leveling off at the brim, and weighing the cream filled.

$$\frac{\text{(Weight of composition)} - \text{(Weight of aerosol whipped cream immediately after dispensed)}}{\left(\begin{array}{c}\text{Weight of aerosol whipped cream immediately}\\ \text{after dispensed}\end{array}\right)} \times 100$$

[Water Separation Property]

3 g of whipped cream immediately after dispensed was placed at the center of a paper filter (a circular filter with a diameter of 11 cm and a weight of 1.2 g, manufactured by ADVANTEC) to form a circle having a diameter of about 3 cm without forming any hollow space. The filter paper was then stored at 5° C. for 48 hours.

The outline of water seeping out from the whipped cream into the paper filter was traced with a ballpoint pen. The whipped cream was removed from the filter paper, and the filter paper was dried at 50° C. for 10 min using a dryer.

The dried paper filter was cut out along the ballpoint pen trace and the cut-out portion was weighed. The weight of the cut-out portion was converted to area by the following equation, and the water separation property was evaluated.

$$\text{Water separation property (cm}^2) = 95.03 \text{ cm}^2 \times \text{(weight of cut-put portion (g))}/1.2 \text{ (g)}$$

[Foam Hardness]

The foam hardness was measured by using Curdmeter MAX ME-500, manufactured by Aska Equipments. An aerosol whipped cream immediately after dispensed was filled in a plastic container, and the hardness immediately after dispensed was measured. The conditions for measurement are as follows:

Measurement jig: φ16 mm

Initial spring load: 200 g

Ascending speed of sample stage: 0.36 cm/sec

Sample volume: 25 ml

<Sensory Evaluation of Aerosol Whipped Cream>

In a sensory evaluation, the aerosol whipped creams prepared in Examples 1 to 3 and Comparative Example 1 were evaluated by five panelists for evaluation items of rich flavor, mouthfeel, gloss and chipping. Five panelists were asked to score each evaluation item according to the scoring standard described below. The scores of the five panelists were then averaged, and each aerosol whipped cream was evaluated according to the following evaluation criteria.

[Evaluation Criteria]

"A" indicates average score of 4.0 or higher;

"B" indicates average score of 3.5 or higher and lower than 4.0;

"C" indicates average score of 3.0 or higher and lower than 3.5; and

"D" indicates average score of lower than 3.0.

[Rich Flavor]

Rich flavor of the aerosol whipped creams was scored by tasting each aerosol whipped cream immediately after dispensed and determining the degree of thickness (i.e., richness) felt by the tongue.

[Scoring Standard]

5 points indicate a very high richness and rich flavor;

4 points indicate a moderate richness and moderately rich flavor;

3 points indicate no rich flavor;

2 points indicate a less richness and no rich flavor; and 1 point indicates no richness and no rich flavor.

[Mouthfeel]

Mouthfeel of the aerosol whipped creams was scored by tasting each aerosol whipped cream immediately after dispensed and determining the texture felt in the mouth by the tongue.

[Scoring Standard]

5 points indicate very smooth;

4 points indicate smooth;

3 points indicate plain;

2 points indicate less smooth; and 1 point indicates little smoothness.

[Gloss]

Gloss (glossiness) of the aerosol whipped creams immediately after dispensed was scored by visual inspection.

[Scoring Standard]

5 points indicate very glossy;

4 points indicate glossy;

3 points indicate moderately glossy;

2 points indicate no gloss; and 1 point indicates no gloss and very matte.

[Chipping]

Chipping (gaps on the surface) of the aerosol whipped creams immediately after dispensed was scored by visual inspection.

[Scoring Standard]

5 points indicate smooth;

4 points indicate moderately smooth and no gaps;

3 points indicate no gaps;

2 points indicate small gaps observed; and 1 point indicates large gaps observed.

TABLE 2

| | Composition for aerosol whipped cream | | | | | | Evaluation of characteristics of aerosol whipped cream | | |
|---|---|---|---|---|---|---|---|---|---|
| | HPMC (wt %) | Oil (wt %) | Non-fat solid (wt %) | Water (wt %) | Sweetener (wt %) | Viscosity (mPa · s) | Overrun (%) | Water separation (cm²) | Foam hardness (g) |
| Example 1 | HPMC-1 [0.03] | Vegetable oil [36.0] | Non-fat solid [3.15] | Water [52.82] | Sucrose [8.0] | 63.1 | 292.2 | 15.2 | 29.1 |
| Example 2 | HPMC-2 [0.03] | Vegetable oil [36.0] | Non-fat solid [3.15] | Water [52.82] | Sucrose [8.0] | 62.9 | 325.4 | 16.6 | 26.5 |
| Example 3 | HPMC-3 [0.02] | Vegetable oil [36.0] | Non-fat solid [3.15] | Water [52.82] | Sucrose [8.0] | 65.9 | 291.6 | 14.7 | 34.7 |
| Comparative Example 1 | HPMC-4 [0.03] | Vegetable oil [36.0] | Non-fat solid [3.15] | Water [52.82] | Sucrose [8.0] | 67.6 | 337.8 | 18.2 | 22.3 |

| | Sensory evaluation of aerosol whipped cream | | | |
|---|---|---|---|---|
| | Rich flavor | Mouthfeel | Gloss | Chipping |
| Example 1 | A | A | A | A |
| Example 2 | A | B | A | A |
| Example 3 | A | A | A | A |
| Comparative Example 1 | C | B | B | B |

* In table, HPMC represents hydroxypropyl methylcellulose.

<Results of Evaluation of Aerosol Whipped Cream>

When the composition for aerosol whipped cream containing HPMC-1, HPMC-2, or HPMC-3 was used to prepare an aerosol whipped cream, each of the resulting creams maintained high overrun, and also had a favorable foam hardness and water separation property, as compared to the cream foamed from the composition containing HPMC-4. Furthermore, each of the resulting creams obtained high scores for sensory evaluation of gloss, chipping and rich flavor. One reason for this is considered that HPMC-1, HPMC-2, and HPMC-3, each having a ratio of interfacial elastic modulus to interfacial viscous modulus of 2.0 or higher, can provide an aerosol whipped cream having a combination of suitable foamability and suitable foam film strength, and such aerosol whipped cream can suppress light texture caused by the foam of the cream disappeared upon eating.

Furthermore, when the composition for aerosol whipped cream containing HPMC-1, HPMC-2, or HPMC-3 was used to prepare an aerosol whipped cream, each of the resulting whipped creams had a reduced water separation property. The reason for this is considered that since HPMC-1, HPMC-2, and HPMC-3 have a ratio of interfacial elastic modulus to interfacial viscous modulus of 2.0 or higher, the composition containing HPMC-1, HPMC-2, or HPMC-3 was able to provide an aerosol whipped cream having a combination of suitable foamability and suitable foam film strength as opposed to the composition containing HPMC-4. Such whipped cream was able to form robust, persisting foam that has stable cells that are less likely to be merged or discharge water. As a result, the foam hardness was improved, rich flavor was enhanced, and water separation was decreased. In addition, the resulting foam did not have excessively high overrun but had the improved water separation property, thereby leading to improved gloss.

Moreover, a comparison between Examples 1 and 3 and Example 2 demonstrated that aerosol whipped cream having desirable or favorable water separation, foam hardness and mouthfeel could be obtained by using a composition containing HPMC having a ratio of interfacial elastic modulus to interfacial viscous modulus of 3.0 or higher.

It should be noted that the compositions for aerosol whipped cream in Examples 1 to 3 and Comparative Example 1 were produced such that their viscosities were substantially equivalent to one another in view of the effects of the viscosity of each composition during dispensing.

<Production of Aerosol Dressing>

HPMC used as a material was HPMC-1 to -4 prepared in Synthesis Examples 1 to 4. For the oil, vegetable oil ("Nisshin Canola Oil," a salad oil manufactured by Nisshin Oillio) was used. For the seasonings, mayonnaise ("Kewpie Mayonnaise," manufactured by Kewpie, containing 74.67 wt % vegetable oil, 2.0 wt % salt, 23.33 wt % other seasonings), vinegar ("Healthy Grain Vinegar," manufactured by Tamanoi Vinegar), and salt ("Hakata No Shio," manufactured by Hakata Salt) were used. Tap water was used as water. Sucrose ("Mom Brand White Sugar," manufactured by Mitsui Sugar) was used as the sweetener.

Example 4

To 40 g of the vegetable oil, 5.0 g of 4.0 wt % aqueous solution of the prepared HPMC-1 (5° C.), 1 g of sucrose, 20 g of vinegar, 2.0 g of salt, 25 g of mayonnaise, and 7.0 g of water were added, and the mixture was stirred using a magnetic stirrer ("HS-360," manufactured by AS ONE) at 500 rpm to 600 rpm for about 10 min while cooled on ice at 0° C. to 5° C. This resulted in an aerosol dressing composition.

The composition for aerosol dressing was then transferred to an espuma container ("Advanced Dispenser S," manufactured by Nippon Tansan Gas), and nitrous oxide gas was filled until the internal pressure of the container reached 0.8 MPa. The espuma container was manually shaken for 15 seconds, and the composition was then dispensed at 25° C. from the nozzle to prepare a foamed aerosol dressing.

Examples 5 and 6 and Comparative Example 2

For Example 5, a composition for aerosol dressing and an aerosol dressing were produced in the same manner as in Example 4, except that HPMC-2 was used in place of HPMC-1.

For Example 6, a composition for aerosol dressing and an aerosol dressing were produced in the same manner as in Example 4, except that 2.5 g of 4.0 wt % aqueous solution of HPMC-3 (5° C.) and 9.5 g of water were used in place of 5.0 g of 4.0 wt % aqueous solution of HPMC-1 (5° C.) and 7.0 g of water.

For Comparative Example 2, a composition for aerosol dressing and an aerosol dressing were produced in the same manner as in Example 4, except that 10.0 g of 4.0 wt % aqueous solution of HPMC-4 (5° C.) and 2.0 g of water were used in place of 5.0 g of 4.0 wt % aqueous solution of HPMC-1 (5° C.) and 7.0 g of water.

<Measurement of Physical Properties of Composition for Aerosol Dressing>

The viscosities of the compositions for aerosol dressing prepared in Examples 4 to 6 and Comparative Example 2 were measured. The method used for measuring the viscosity is described below. The results are shown in Table 3.

[Viscosity]

The sample measurement unit of a rheometer ("MCR-301," manufactured by Anton Paar) was pre-conditioned to 5° C., and the composition for aerosol dressing immediately after preparation was poured into a CC27 measurement cup (a cylindrical aluminum container with a diameter of 30 mm and a height of 80 mm) to the marked line (25 ml). Measurements were then started with a shear rate of 100 l/s. The measurement unit were kept constant at 5° C., and data were collected twice per minute. The shear viscosity measured 5 minutes after the start of the measurement was assigned to be the viscosity of the composition for aerosol dressing at 5° C.

<Evaluation of Characteristics of Aerosol Dressing>

Characteristics of the aerosol dressings prepared in Examples 4 to 6 and Comparative Example 2 were evaluated. Methods used for evaluating each characteristic are described below. The results of evaluation are shown in Table 3.

[Overrun]

Overrun is a percent (%) increase in the volume immediately after dispensing and is expressed by the following equation: "Weight of composition" in the equation is obtained by filling a composition for aerosol dressing to the brim of a 25 ml plastic bottle (bar bottle, manufactured by AS ONE), and weighing the composition filled. Also, "Weight of aerosol dressing immediately after dispensed" in the equation is obtained by filling an aerosol dressing immediately after dispensed to the brim of a 25 ml plastic bottle (bar bottle, manufactured by AS ONE), leveling off at the brim, and weighing the aerosol dressing.

$$\frac{(\text{Weight of composition}) - (\text{Weight of aerosol dressing immediately after dispensed})}{(\text{Weight of aerosol dressing immediately after dispensed})} \times 100$$

[Foam Hardness]

The foam hardness was measured by using Curdmeter MAX ME-500, manufactured by Aska Equipments. An aerosol dressing immediately after dispensed was filled in a plastic container, and the hardness immediately after dispensed was measured. The conditions for measurement are as follows:

Measurement jig: φ16 mm

Initial spring load: 100 g

Ascending speed of sample stage: 0.36 cm/sec

Sample volume: 25 ml

<Sensory Evaluation of Aerosol Dressing>

In a sensory evaluation, the aerosol dressings prepared in Examples 4 to 6 and Comparative Example 2 were evaluated by five panelists for evaluation items of foam stability, foam fineness, and rich flavor. Five panelists were asked to score each evaluation item according to the scoring standard described below. The scores of the five panelists were then averaged, and the aerosol dressings were evaluated according to the following evaluation criteria.

[Evaluation Criteria]

"A" indicates average score of 4.0 or higher;

"B" indicates average score of 3.5 or higher and lower than 4.0;

"C" indicates average score of 3.0 or higher and lower than 3.5; and

"D" indicates average score of lower than 3.0.

[Foam Stability]

Foam stability of the aerosol dressings was scored by visually observing the state of foam during 30 seconds since dispensed.

[Scoring Standard]

5 points indicate that the foam persists well;

4 points indicate that the foam almost persists though the foam partially liquefies;

3 points indicate that liquid and foam are approximately half and half;

2 points indicate that most of the foam quickly liquefies; and 1 point indicates that the foam quickly liquefies and does not be mixed well with the food.

[Foam Fineness]

Foam fineness of the aerosol dressings was evaluated by observing appearance of each aerosol dressing upon dispensed.

[Scoring Standard]

5 points indicate that the foam is very fine and aesthetically favorable;

4 points indicate that the foam is almost fine;

3 points indicate that the foam is fine, though partially coarse;

2 points indicate that the foam is coarse; and 1 point indicates that the foam is coarse and soggy.

[Rich Flavor]

Rich flavor of the aerosol dressings was evaluated by tasting each aerosol dressing immediately after dispensed and determining the degree of thickness (i.e., richness) felt by the tongue.

[Scoring Standard]

5 points indicate a very high richness and rich flavor;

4 points indicate a moderate richness and moderately rich flavor;

3 points indicate no rich flavor;

2 points indicate moderately light mouthfeel and no rich flavor; and 1 point indicates very light mouthfeel and no rich flavor.

TABLE 3

| | HPMC (wt %) | Oil (wt %) | Water (wt %) | Sweetener (wt %) | Seasoning (wt %) | Seasoning (wt %) | Seasoning (wt %) | Viscosity (mPa · s) |
|---|---|---|---|---|---|---|---|---|
| | Composition for aerosol dressing | | | | | | | |
| Example 4 | HPMC-1 [0.2] | Vegetable oil [58.7] | Water [11.8] | Sucrose [1.0] | Vinegar [20.0] | Salt [2.5] | Mayonnaise [5.8] | 199 |
| Example 5 | HPMC-2 [0.2] | Vegetable oil [58.7] | Water [11.8] | Sucrose [1.0] | Vinegar [20.0] | Salt [2.5] | Mayonnaise [5.8] | 199 |
| Example 6 | HPMC-3 [0.1] | Vegetable oil [58.7] | Water [11.9] | Sucrose [1.0] | Vinegar [20.0] | Salt [2.5] | Mayonnaise [5.8] | 172 |
| Comparative Example 2 | HPMC-4 [0.4] | Vegetable oil [58.7] | Water [11.6] | Sucrose [1.0] | Vinegar [20.0] | Salt [2.5] | Mayonnaise [5.8] | 178 |

| | Evaluation of characteristics of aerosol dressing | | Sensory evaluation of aerosol dressing | | |
|---|---|---|---|---|---|
| | Overrun (%) | Foam hardness (g) | Foam persistence | Foam fineness | Rich flavor |
| Example 4 | 363 | 2.4 | A | A | A |
| Example 5 | 362 | 2.2 | B | A | A |
| Example 6 | 373 | 3.8 | A | A | A |
| Comparative Example 2 | 377 | 1.3 | C | B | B |

* In table, HPMC represents hydroxypropyl methylcellulose.

<Results of Evaluation of Aerosol Dressing>

When the composition for aerosol dressing containing HPMC-1, HPMC-2, or HPMC-3 was used to prepare an aerosol dressing, the resulting dressing not only had a favorable foam hardness, but also earned generally higher scores in sensory evaluation for the rich flavor, foam stability and foam fineness as compared to the dressing prepared from the composition containing HPMC-4, while maintaining high overrun. The reason for this is considered that HPMC-1, HPMC-2, and HPMC-3, each having a ratio of interfacial elastic modulus to interfacial viscous modulus of 2.0 or higher, could provide an aerosol dressing having a combination of suitable foamability and suitable foam film strength, and such aerosol dressing could form robust foam that persists even if it has high overrun. As a result, the foam stability was improved and the foam characteristics such as foam hardness, foam stability and foam fineness became favorable, thus, leading to improved rich flavor.

Moreover, a comparison between Examples 4 and 6 and Example 5 demonstrated that the improvement in the foam stability of the resulting aerosol dressing could be enhanced by using a composition containing HPMC having a ratio of interfacial elastic modulus to interfacial viscous modulus of 3.0 or higher. In addition, Examples 4 and 6 indicated that the improvement in the foam stability did not be affected depending on the viscosity of the composition. It should be noted, however, that the compositions for aerosol dressing in Examples 4 to 6 and Comparative Example 2 were produced such that their viscosities were substantially equivalent to one another in view of the effects of the viscosity of each composition during dispensing.

INDUSTRIAL APPLICABILITY

According to the composition for aerosol food product, the hydroxypropyl methylcellulose and the methods of producing hydroxypropyl methylcellulose in one embodiment of the present invention, an aerosol food product can be produced that, when foamed, achieve a favorable state of foam and desirable palatability, such as rich flavor, even when the product is prepared by using an espuma. In addition, the composition for aerosol food product that can be widely distributed can be produced and used on industrial scales.

We claim:

1. A composition for an aerosol food product, comprising hydroxypropyl methylcellulose and water, wherein a ratio of interfacial elastic modulus to interfacial viscous modulus of the hydroxypropyl methylcellulose is equal to or higher than 2.0 when measured with a tensiometer at 25° C. using a 0.2% by mass aqueous solution, wherein the viscosity of the hydroxypropyl methylcellulose is in a range between 5.5 mPa·s and 1000.0 mPa·s when measured with a viscometer at 20° C. using a 2% by mass aqueous solution, and the degree of substitution with methoxy groups per unit of anhydrous glucose is from 1.60 to 1.95.

2. The composition according to claim 1, wherein the interfacial elastic modulus of the hydroxypropyl methylcellulose is in a range between 10.0 mN/m and 210.0 mN/m.

3. The composition according to claim 1, wherein the interfacial viscous modulus of the hydroxypropyl methylcellulose is in a range between 5.0 mN/m and 35.0 mN/m.

4. The composition according to claim 1, wherein the aerosol food product is selected from the group consisting of dairy products, liquid condiments, beverages and sauces for sweets.

5. The composition according to claim 4, wherein the dairy product is selected from the group consisting of whipped cream, whipped cheese and yogurt.

6. The composition according to claim 4, wherein the liquid condiment is selected from the group consisting of dressings, Ponzu sauces, Tare sauces, Soup bases, Dashi stocks and Worcestershire sauces.

* * * * *